June 25, 1968          P. EISLER          3,390,014
SECONDARY ELECTRIC BATTERIES HAVING PLURALITY OF THIN
FLEXIBLE INTERMEDIATE BIPOLAR PLATES
Filed May 19, 1964          5 Sheets-Sheet 1

PAUL EISLER INVENTOR

ATTORNEYS

June 25, 1968 P. EISLER 3,390,014
SECONDARY ELECTRIC BATTERIES HAVING PLURALITY OF THIN
FLEXIBLE INTERMEDIATE BIPOLAR PLATES
Filed May 19, 1964 5 Sheets-Sheet 2

PAUL EISLER INVENTOR

ATTORNEYS

PAUL EISLER INVENTOR

ATTORNEYS

PAUL EISLER INVENTOR

ATTORNEYS

PAUL EISLER INVENTOR

ATTORNEYS

United States Patent Office 3,390,014
Patented June 25, 1968

3,390,014
SECONDARY ELECTRIC BATTERIES HAVING PLURALITY OF THIN FLEXIBLE INTERMEDIATE BIPOLAR PLATES
Paul Eisler, 57 Exeter Road, London NW. 2, England
Continuation-in-part of application Ser. No. 28,414, May 11, 1960. This application May 19, 1964, Ser. No. 368,544
The portion of the term of the patent subsequent to July 21, 1981, has been disclaimed
21 Claims. (Cl. 136—6)

This application is a continuation-in-part of my application Ser. No. 28,414, filed May 11, 1960, since issued under No. 3,141,795.

The invention relates to secondary electric storage batteries. Although lead-acid batteries are specifically described hereinafter by way of example the invention is not limited to such batteries but comprehends other types of secondary batteries having a plurality of individual cells to be actuated by an electrolyte and connected electrically in series.

The battery according to the present invention includes a plurality of closely spaced generally parallel aligned thin flexible bipolar plates disposed between the individual electrolyte chambers to constitute the individual cells connected electrically in series. Each bipolar plate comprises a barrier layer and two outer layers. The barrier layer as a whole is electrically conductive through its thickness over substantially all its area and is impervious to the electrolyte and the two outer layers are of active material on opposite sides of the barrier layer in good contact therewith over substantially its whole area. The bipolar plates are arranged so that active layers of opposite polarity alternate throughout the series, while a barrier layer with a single layer of active material of appropriate polarity closes each of the two end cells of the series. Flexible electrolyte resistant electric insulating material completes electrolyte chambers between the active layers of successive bipolar plates and of the end cells, while pervious electrically insulating means are located between the active layers in every cell, pervious supporting means are disposed over substantially the whole area of the active layers, and means exerting endwise pressure on the battery causes the supporting means to hold each active layer in pressure contact with its respective barrier layer over substantially the whole area of the barrier layer, the insulating means serving to prevent the endwise pressure from producing direct contact between the two active layers of opposite polarity in each cell. Thus the invention does not rely on adhesion between the active layers and the barrier layer to maintain the active layers in position and in electrical contact with the barrier layers which even if good initially is not maintained after a few cycles of charge and discharge but ensures that this contact is maintained mechanically so that good contact is maintained throughout a very long life of many cycles of charge and discharge. Moreover parts of the active layer cannot fall away and thus they cannot be lost from the operating cycle and cannot build up in the bottoms of the cells and cause loss of charge by leakage. Nor is it necessary to provide a substantial excess of active material to allow for losses of active material from the operating cycle.

The use of a thin layer of active material held in place by pressure ensures that the whole of the active material is available to the electrolyte while helping to hinder access of the electrolyte at the barrier layer so that attack and penetration of the latter is slowed down even if the material of which it is made is not absolutely resistant.

A secondary electric battery having bipolar plates is not broadly new but generally the plates have been of the same bulky character as the pasted grids used in other types of battery. Where thin bipolar plates have been proposed they have either been intended for a very short life when the character of any barrier layer even if it had been thought of before is unimportant, and, as the teaching of the present invention reveals, it may indeed be omitted altogether, or the problems presented if the battery is to have a long life have been ignored. In addition methods of assembly and closure of the cells have been such that a really thin bipolar plate to which the term foil could be applied could not be used in areas such that if left unsupported and picked up by the edges they would buckle; in the present battery the endwise pressure enables foil thickness plates to be used (by which is meant plates which are flexible and of which the individual layers do not usually exceed 0.030 inch thickness).

The barrier layers have been stated above to be impervious to the electrolyte. By this is meant that the barrier layer can resist penetration by the electrolyte over many cycles of charge and discharge thus giving the battery a very long life. A preferred material whereby the desired electrical conductivity combined with resistance to electrolyte can be obtained, is impermeable carbon and the invention provides particular constructions of barrier layer using this material and methods for its production. Here again impermeable means impermeable in the environment and for the life in view and not absolutely impermeable or impermeable to such difficult substances as helium although it is possible to achieve even such impermeability with carbon produced and graphitised under appropriate conditions; for the present purposes a carbon of adequate impermeability can be obtained at less cost.

It should clearly be understood that the term "carbon" is used herein in a wide sense and includes graphite; what is and what is not graphite is not universally agreed in the trade, but what matters here is not the precise cystalline structure of the carbon but its impermeability. Impermeable carbon is highly resistant to chemical reagents including those used as electrolytes in secondary batteries, and to all the products of reaction in such batteries except oxygen nascens in respect of which the present invention makes special provision as will be described more fully later. One such provision is the protection of the impermeable carbon particles incorporated in the barrier layer by the use of a binder consisting at least in part of the metal from which the active layer adjacent the barrier layer is formed. In a lead acid battery the carbon may thus be protected by metallic lead on the side of the barrier layer which carries the positive active layer.

In the case of a lead-acid battery, a composite structure may be used as a barrier layer such as a structure consisting of a thin centre layer of lead, impermeable carbon particles bound together on the side which carries the negative active layer with an electrolyte resistant plastic such as a synthetic resin or bitumen, and impermeable carbon particles bound together on the side which carries the positive active layer with lead, or with a binder in which particles of metallic lead are dispersed.

A battery according to the present invention with its thin plates and the corresponding thin electrolyte chambers can be made very compact and since the current is conducted into it and through it over substantially its total cross section which approximates to the superficial area of the active layers very high rates of charge and discharge can be employed. The pressure on the active layers resists the electrical forces which tend to displace the active material as well as the loosening by electrochemical action. Such high rates necessarily involve high heat development and the invention provides for cooling of the battery. Also, it provides for switching an assembly of units into series and parallel arrangements so that the battery can conveniently be charged through a rectifier from ordinary supply mains and then be used to supply current at a lower voltage, for example, 12 volts as is common on motor vehicles. A further development combines the cooling and switching arrangements.

A number of battery units can be assembled in end to end relationship and be held by retaining means through which the end-wise pressure is applied. Since the barrier layers with the active layers are quite thin, and since the space between the two active layers in any one cell can be quite small, the overall thickness of a battery unit or module with a terminal voltage nominally of 12 volts, is quite small. It therefore suffices to obtain adequate cooling to interpose hollow cooling members defining passages for a cooling medium between adjacent units of an end to end assembly. These cooling members will be of substantially the same area as the ends of the units.

Further features and advantages of the invention will appear from the further description with reference to the accompanying drawings in which.

Figure 1:
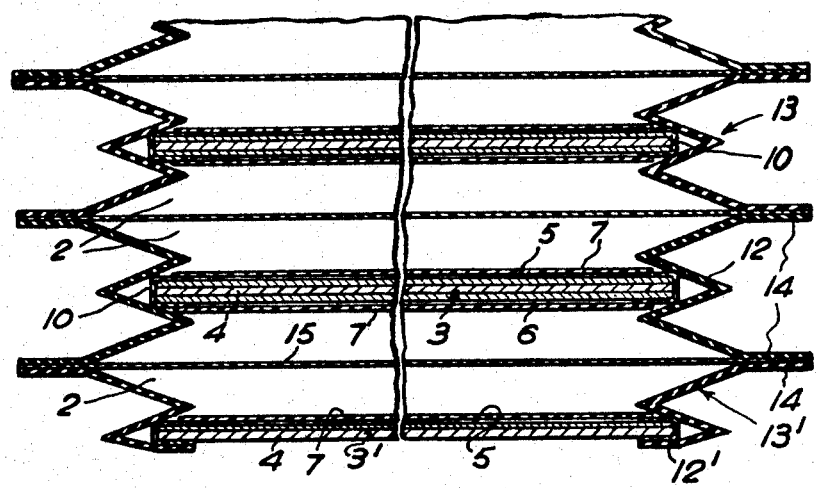
FIGURE 1 is a view in horizontal cross-section of part of a battery unit or module according to the invention, the section being taken as shown by the line I—I on FIGURE 2.
Figure 2:
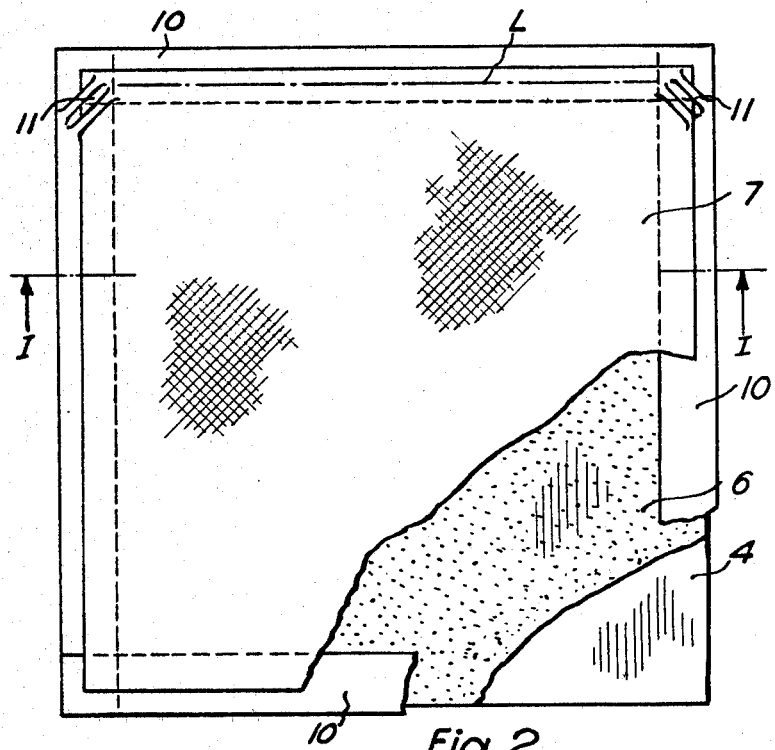
FIGURE 2 is an elevation of a taped bipolar plate forming part of the FIGURE 1 module before final assembly thereof.

Referring to FIGURES 1 and 2 of the drawings, the module of FIGURE 1, designated generally 1, comprises six series-connected similar cells 2; only a few cells are illustrated and these are shown somewhat expanded for the sake of clarity.

The module 1 comprises five intermediate foils 3 and in this example, end or extreme foils 3' of similar dimensions which are spaced apart and disposed parallel and in alignment with one another, each foil comprising an impervious conducting barrier layer 4. One extreme foil 3' comprises a positive and the other a negative layer of active material, which layers are supported on the inside faces of the corresponding barrier layers 4. Intermediate foils 3 constitute bipolar plates and each comprises a layer of positive active material supported on one face of its barrier layer 4 and a layer of negative active material supported on the other face. The layers of positive and negative active material, are, respectively all similar and designated, respectively, 5 and 6; each active layer is supported over its entire area. Each active layer 5, 6 is covered with a pervious insulating separator film 7 e.g. nylon or P.V.C. gauze. Thus each cell 2 has electrodes consisting of a positive active layer 5 and a negative active layer 6, each covered by a porous separator film 7, each active layer being supported on a barrier layer 4 providing an end wall of the cell, adjacent cells being separated by a single common barrier layer and having their electrodes electrically connected by said barrier layer through its thickness and over its whole area. The terminals of the module are provided by the outer faces of the barrier layers 4 of the extreme foils 3' which are capable of conducting the battery current from extreme electrodes to the exterior of the battery through the thickness of said extreme barrier layers and over the whole area thereof.

All the edges of the foils 3, 3' are bound with impervious insulating tape 10, e.g., of thermo-plastic plastics material, the foils and separator films 7 being adhesively—or heat-sealed to the tape at their edges—the foils may be sealed either to the outside, as shown, or to the inside of the tapes 10. The top corners of each foils 3, 3' together with its tapes 10 are embossed with a spilling channel 11 sloping downwardly to the side edges of the foil and tape. The side edges of the foils 3 together with the tapes 10 thereon are then introduced into the centre fold 12 of a concertina-folded tape 13 (e.g., also of a thermo-plastic plastics material) presenting a pair of free edge portions 14: the side edges of the foils 3' are introduced into folds 12' of folded tapes 13' similar to the tapes 13 except that they have only one free edge portion 14. The tapes 13, 13' extend along the side edges only up to the bottom of the spilling channels 11: alternatively they could extend to the top of the foils and be perforated in the region of the outlet ends of the channels 11. The adjacent edge portions 14 of the various tapes 13, 13' are then sealed together as shown in FIGURE 1, preferably over two parallel lines, to sandwich pervious and preferably elastically compressible centre separators 15 for the cells, and the tapes 10 and sealed in the folds 12, 12'; as before, the sealing may be by adhesive or by application of heat. Finally the bottom of the module is sealed by "potting" the so-far assembled module in an elastomeric sealing compound that sets to an impervious yet elastic mass (not shown) between the bottom edges of the foils. This mass extends up to the bottom edges of the separator films 7 and downwards slightly below the module to form a shock-absorbing cushion on which the module can rest. The completed module will in use require to be kept under some degree of endwise pressure: various means to this end are described later. When under pressure the thickness of the module, which for illustrative purposes is shown much exaggerated in FIGURE 1, will be quite small.

The top edge of each cell 2 presents a narrow barely open slit between adjacent surfaces of the binding tapes 10, which suitably stiffen the top edges of the foils. The slit provides an escape for gas and enables the filling of the cell, which is effected by running a suitable liquid (distilled water in the case of a lead-acid battery) over the top of the module until it runs out of the spilling channels 11. These spilling channels determine the electrolyte level, which should lie within the depth of the top edge binding tapes 10; in FIGURE 2 the electrolyte level is shown at L (an alternative—or possibly additional—way of obtaining the same effect as results from the channels 11 would be to chamfer the corners of the cells, again providing for liquid discharge over or through the concertina tapes 13, 13'). It should be noted that without providing for adequate overflow through the spilling channels or equivalent the centre separators 15 would have to be dimensioned thicker or there would be a danger of a temporary rise of the liquid level above the top edge tapes 10. This liquid would form a leakage path or shunt between the cells 2. With a given endwise pressure on the module the volume of electrolyte in each cell, which is small, is determined by the nature and thickness of the centre separator 15.

The production of the modules can be completely automated; the foil construction is made of and at least the main part of its treatment is done on the foil strip in bulk in a continuous process and the separator films 7 are also laminated to the foil while it is a long strip off a coil. The same applies to the sealing of the edges of these films. The cutting of the foil into the size used in the module, the various tape applications and other cell assembly procedures can be carried out on an automatic flow line with no or only a minimum of human labor.

The porous separator films can be very thin porous plastic or microporous rubber films. Other alternatives are treated veneer films of beech, mango or Port Orford white cedar, treated filter paper or other compressed fibre material, such as glass mats, etc. Any of the known separator materials can be used if it is available as a very thin layer. The porosity or structure of the separator film 7 covering the positive foil surface must, per unit of time, and at least in conjunction with the nature of the active layers as described later, admit a larger volume of electrolyte to the positive foil surface than the volume admitted to the negative surface. The film 7 covering the positive active layers is therefore preferably of greater porosity than that covering active layers and/or crimped with the crimps running vertically, while the separator film covering the negative active layers can be smooth.

The centre separators 15 may be of fabric, crimped filter paper, mat, or any suitable thin porous material, which nevertheless has sufficient thickness and a structure which permits a ready flow of electrolyte particularly in vertical direction.

Each separator is of the same area as the separator films 7: instead of being secured at is edges to the tapes 13, 13' it may be left loose and kept in place only by endwise pressure on the module.

Other modifications in the module of FIGURES 1 and 2 can be made beyond those already indicated. Thus by way of example instead of "potting" the module to seal the bottom edges, such edges can be sealed by further lengths of concertina tape such as the tapes 13, 13'; the various lengths of tape would preferably be pre-cut to give the mitering lines.

An important factor determining the life of a conventional accumulator is the rate of shedding of the active material from the plate or grid. The surface layer structure of the active materials on the foils 4 in the present battery, their enclosure in the separator films 7, the elastic nature of the central separator 15 of each cell and the endwise pressure on the module over its whole area practically eliminate this factor. Furthermore the pressure maintains good electrical contact between the whole area of the active material and the barrier layer and helps to hinder access of the electrolyte to the barrier layer itself. This factor also helps to prolong the life of the battery, although this is also affected by the nature of the barrier layer itself which is further described later. On the other hand, since the active layers are thin, the electrolyte has access to substantially the whole of the active material so that the capacity of the battery in relation to the weight of active material is high. The endwise pressure further supports the individual bipolar plates of foil thickness against buckling that they may be so thin that if unsupported they could not be held by their edges alone without buckling.

Figure 3:
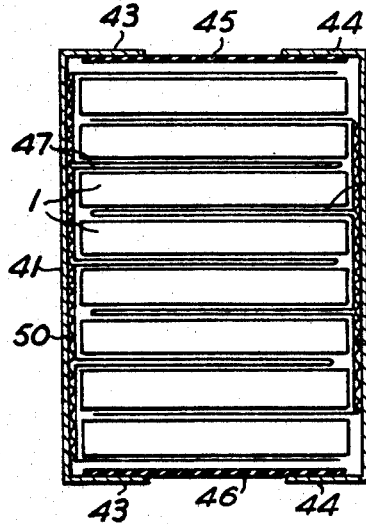
FIGURES 3 and 4 are horizontal sectional views of two forms of battery comprising interconnected modules, FIGURE 4 being shown partly broken away.
Figure 11:
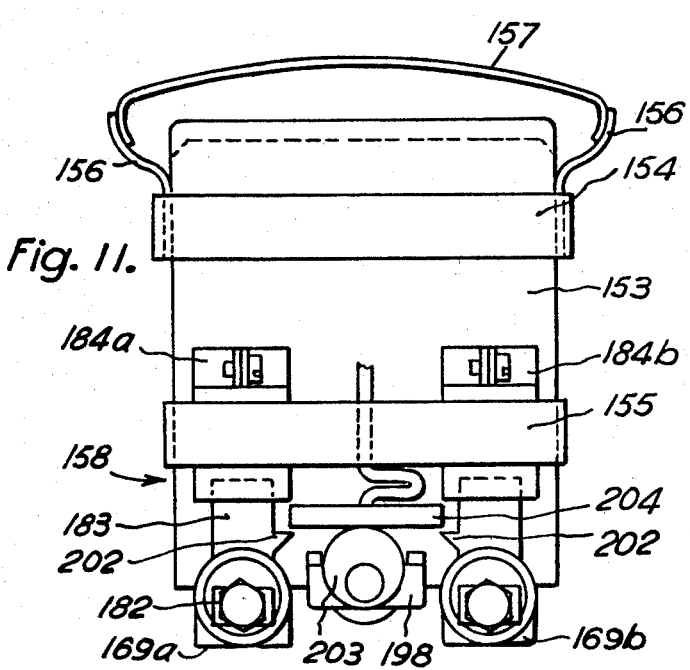
FIGURE 11 is an end view of the FIGURE 5 battery.

As has been explained, the module 1 illustrated in FIGURES 1 and 2 requires mechanical support. In general it will also be necessary to assemble a number of modules in one battery to provide adequate amperehours. FIGURE 3 shows a battery comprising eight parallel-connected modules 1 each represented simply as a rectangle. The battery comprises a pair of stout metallic channel-members 41, 42 embracing opposite sides of the modules 1 which are arranged end to end in a row the flanges 43, 43, 44, 44 of the channel members overlying the end modules of the row and being spaced therefrom by insulating pressure-distributing end plates 45, 46. The modules 1 are disposed with their ends of similar polarity adjacent one another and interconnected by two bands 47, 48 one for the positive ends and the other for the negative ends. Each band 47, 48 is made of strong, highly conductive and highly flexible foil, such as copper foil, which is covered with lead and makes contact over the whole area of each module end face of one polarity, being led concertina-fashion down one side of the row of the modules and in and out between appropriate end faces. Current is transmitted from the bands 47, 48 to the channel members 41, 42 (whose webs preferably bear an intimate coating of lead on their inner sides) by means of further bands 50, 51 which are crimped over their whole area and extend over the greater part of the length of the webs of the members 41, 42 in contact therewith and with the bands 47, 48, the bands 50, 51 thereby forming shunts for current in the bands 47, 48. Terminals (not shown) are provided on the flanges 43, 44 at one end of the battery: alternatively foil ends of bus bars or tape cables could be sandwiched between the end plates 45, 46 and bands 47, 48 respectively. The channel members 41, 42 are held together by means not shown (e.g. flexible tapes) and, like the bands 47, 48, 50, 51 extend over the height of the modules nearly up to the outlets of their spilling channels: the webs of the members 41, 42 mount spilling ducts at their upper edges to receive liquid discharged from the spilling channels, the ducts sloping to one end of the battery, and if desired containing an absorbent material such as cotton wool (these ducts are not shown in FIGURE 3; however ducts are indicated in a somewhat similar construction illustrated in FIGURE 11). The exposed surfaces of the members 41, 42 are coated with an insulator (e.g. a neoprene jacket).

Figure 4:
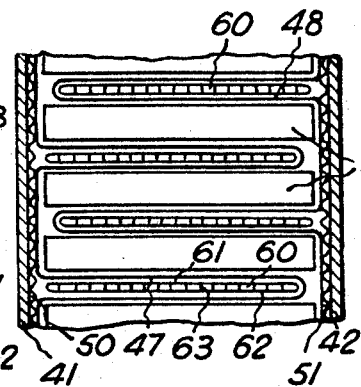

In the simple construction shown in FIGURE 4 the channel-members 41, 42 exert a strong, slightly resilient endwise pressure on the modules to provide support thereto and to ensure good contact between the modules and the bands 47, 48. The members 41, 42 also exert a sideways pressure on the modules which is somewhat resilient due to the crimping of the bands 50, 51 which renders them compressible over their thickness: this provides lateral support to the modules as well as ensuring good electrical contact between the bands 47, 40 and 48, 51 and between the bands 50, 51 and the respective channel-members 41, 42.

To increase the resilience of the endwise support provided to the modules, springs or rubber pads can be provided acting between the flanges 43, 44 and either or both of the insulating plates 45, 46. Rubber pads could also be provided between these plates and the adjacent module end face.

FIGURE 4 illustrates a battery construction which is generally similar to that of FIGURE 3 and in which corresponding parts are given corresponding numerals without further description. The FIGURE 4 construction is distinguished from that of FIGURE 3 by the provision of cooling plates 60 between the modules 1, which are sandwiched between folds of the appropriate bands 47, 48. Each cooling plate comprises a pair of thin sheets 61, 62 of a highly conductive material (e.g. lead plated aluminum) which are joined at either side and held in spaced relation over their width, against the end pressure exerted by members 41, 42, by vertical spacers 63 of similar material. If natural draught air cooling is desired the plates are open at top and bottom. Alternatively the battery can be water cooled by connecting the top and bottom of each plate to headers located in a water circuit including a pump: provision can also be made for alternative air and water cooling, the water cooling being used for example during rapid charging. The headers can be located in various positions and the channeling within the plates 60 arranged suitably. In a further alternative construction the plates can simply be filled with water for a desired time and emptied again afterwards.

If desired the plates 60 can be omitted and the bands 47, 48 replaced by current-conducting bands providing also cooling passages all over their length, e.g. long and flexible versions of the plates 60.

Naturally the cooling provisions can also be used for warming the battery.

During filling of the FIGURE 4 battery with electrolyte or during topping up the battery the upper edges of the cooling plates 60 must be covered up and/or overspilled liquid must be collected in a tray or drain. For covering the upper edges of the cooling plates a device comprising rubber strips held in a frame may be used.

The cooling plates 60 can be provided with rubber legs protruding below the bottom edge of the modules 1 and the battery can rest on these legs instead of resting on the cusions formed by the elastomeric sealing compound covering the bottom of the modules as previously described, which cushions can then be dispensed with.

A rubber leg underneath one of the narrow vertical sides of the cooling plates 60 may continue as an insulating strip all along this side of the plate in order to insulate this side and to prevent electrical contact between it or the adjacent band 47 or 48 and members 41 or 42 and associated bands of opposite polarity. The other narrow vertical side of the cooling plate need not be so insulated: it may protrude slightly laterally beyond the vertical side edges of the adjacent modules 1 so that it makes good pressure contact with the appropriate elastic metal foil 47 or 48. The insulation of the narrow vertical side of the plates 60 can, of course, be effected by a plastic strip, adhesive tape, or other means.

FIGURES 5 to 11 show a battery comprising twenty modules and means for switching these modules so as to provide either a heavy current 12 volt output or a light current 240 volt output: cooling means are also provided. The twenty modules are arranged in end to end relation with a pair of cooling plates 150 and 151 and an insulating sheet 152 between each pair of adjacent modules; at least one cooling plate and sheet are disposed adjacent the ends of the extreme modules. The modules, cooling plates 150, 151 and insulating sheets 152 are held between by a pair of stout nylon straps 154, 155 surrounding the entire assembly. The upper strap 154 carries a channel member 156 running the entire length of the assembly at either side thereof and providing a spilling duct to receive liquid discharged from the cells. The channel members 156 are inclined to one end to discharge liquid free of the battery, and locate a porous cover 157 for the assembly. The lower strap 155 mounts a switch gear arrangement designated generally 158 at either end of the assembly.

Each cooling plate designated generally 150, 151 comprises a rectangular metal sheet 159 which extends over the whole area presented by the extreme end foil of the adjacent module and has a flat surface in overall contact therewith. The sheet 159 carries a series of integral ribs 160, 161 and projections 162, 163 and 164, all of which ribs and projections extend into sealing engagement with the insulating sheet 152 which is conveniently made of P.V.C. or other slightly resilient substance. The ribs 160 are located at the extreme side edges of the sheet 159 and extend from top to bottom while the ribs 161, located halfway between the side edges and the centre line, extend only two-thirds from the bottom to the top. The projections 162 form a series aligned at the top edge of the cooling plate while the projections 163 form a pair located adjacent to and on opposite sides of the centre line, at the bottom of the plate. Projections 164 are located between each rib 161 and adjacent projection 163 and somewhat above them. The ribs 160, 161 extend just below the bottom of modules and provide two pairs of opposed recesses 166, one pair near each side edge of the cooling plate corresponding recesses 166 on the various cooling plates being aligned longitudinally of the battery. The recesses 166 receive bulbous extremities 168 of the flanges of a pair of neoprene-covered metal channel section members 169a, 169b which run the full length of the battery below the modules, cooling plates 150, 151 and insulator sheets 152 and form positive and negative 12 volt busbars respectively and also cooling water headers, as later described. The projections 163 also extend just below the bottom of the modules and define a pair of opposed recesses 165a. The recesses 166a in the various plates are aligned longitudinally of the battery and receive the bulbous edges 168a of an elastic neoprene member 170 of U section which like the busbar members 169a, 169b runs the full length of the battery below the modules, plates 150, 151 and sheets 152. A switch device designated generally 171 is located within the member 170.

Figure 6:
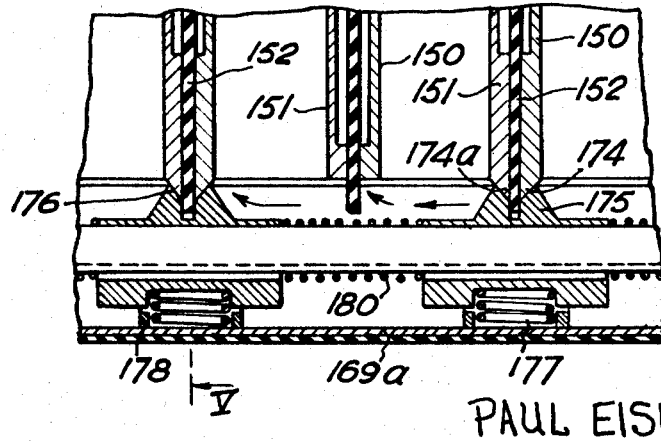
FIGURES 6 and 7 are longitudinal sections on the lines VI—VI, VII—VII respectively shown in FIGURE 5 of the battery illustrated in that figure.

The modules are arranged with adjacent end foils of similar polarity; the cooling plates 150, 151 located between positive module end foils differ from those between negative module end foils in that the former are provided with means for connecting them only to the positive busbar member 169a and the latter only to the negative busbar member 169b; all the cooling plates are provided with means (described later) for connecting them to the switch means 171. The connection means on the cooling plates 150, 151 for connection to the busbar member 169a comprise a thickening 173 adjacent the bottom edge of the sheet 159 in vertical alignment with the member 169a and continuing into a bevelled projection 174 extending below this bottom edge, the bevels on plates 150, 151 being oppositely disposed to form a V-shaped nose 174a extending into the busbar member. Opposite each nose 174a and within the member 169a there is located a collector shoe 175 presenting a V-section recess 176 to mate with the nose 174a (FIGURE 6). The shoe 175 is urged upwardly by a spring 177 seating in a retaining cup 178 and bearing against the web of the busbar member 169a. All the shoes 175 are longitudinally apertured at 175a and threaded on an actuating or guide rod 179, being located in proper axial position thereon by means of distancing springs 180. The ends of the guide rod 179 are received in eccentric cams 182 mounted on the ends of the busbar member 169a and forming part of the switch gear 158 above referred to. In addition to mounting the shoes 175 the guide rod 179 mounts, at each end of the battery, wedge blocks 183 to co-operate with 12 volt positive terminal members 184a secured by the strap 155. It will be understood that with the eccentric cams 182 in one position the guide rod 179 assumes a low position in which it holds the shoes 175 against the springs 177 and out of contact with the noses 174a on the cooling plates 150, 151 while rotation of the eccentric cams 182 by 180° will bring the guide rod 179 to a high position (as illustrated in the drawing) wherein the shoes 175 engage the noses 174a in firm contact due to the upward force exerted on the shoes both through the guide rod and through the springs 177. With the guide or actuating rod 179 in its high position, the wedge blocks 183 make contact with the corresponding terminal member 184a while in the low position of the guide rod 179 the terminal member is disconnected. It will be appreciated that the distancing springs 180 between the shoes 175 together with the play allowed by the oversize apertures 175a therein which receive guide rod 179 prevent any slight misalignment between shoes and cooling plates from spoiling the contact between them.

It will be appreciated that the cooling plates 150, 151 in contact with negative module end foils are connected in similar manner to a negative terminal member 184b: similar parts are given similar reference numerals and further description will be superfluous. It will also be appreciated that both the busbar members 169a, 169b and the actuating or guide rods 179 are available to carry the 12 volt current.

Figure 7:
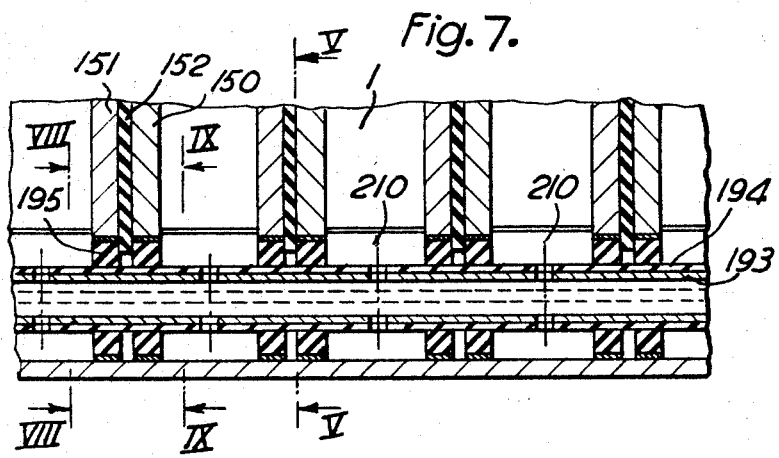
Figure 8:
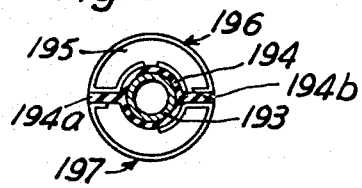
FIGURES 8 and 9 are scrap sections of a switch device forming part of the FIGURE 5 battery, the sections being taken on lines VIII—VIII and IX—IX respectively shown in FIGURE 7.
Figure 9:
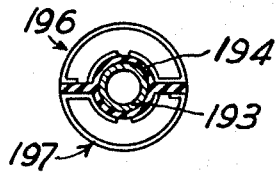
Figure 10:
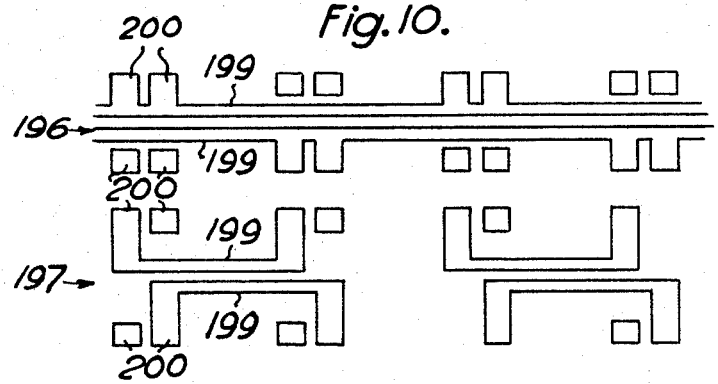
FIGURE 10 is a composite plan view of switch patterns forming part of the switch device.

As seen in FIGURES 7, 8 and all cooling plates 150, 151 are provided with means to connect them to the switch device 171, this means consisting of a thickening 190 disposed centrally adjacent the bottom edge of each sheet 159 terminating in a concave arcuate contact surface 191. The switch device 171 comprises an insulated central metal supporting tube 193 surrounded by an insulating sleeve 194 with two longitudinal ribs 194a, 194b and mounted on the sleeve a series of split rubber bushes 195 registering with the cooling plates 150, 151, the splits in the bushes receiving the ribs 194a, 194b. The bushes 195 and sleeve 194 carry a 12-volt and a 240-volt switch pattern formed of highly conducting foil: these patterns are shown in FIGURE 10, and designated generally 196, 197. The supporting tube 193 is mounted at its ends in blocks 198 forming part of the switch gear arrangement 158, and means are provided for rotating the tube 193 between two positions angularly spaced by 180°. In one position of the tube 193 the 12-volt switch pattern 196 is presented to the arcuate contact surfaces 191 of the cooling plates 150, 151 and in the other position the 240-volt pattern 197 is presented to these surfaces. In each position of the tube 193 the corresponding pattern 196 or 197 provides metal contact areas 199 on the bushes 195 which engage the surfaces 191 under pressure exerted by the neoprene member 170, and metal areas 200 which connect the contact areas 199 in desired manner, the areas 199 and 200 being respectively supported on surfaces of the sleeve 194 and bushes 195 as clearly shown in FIGURES 7 to 10. It will be understood that the 12-volt switch pattern 196 is supplementary to the connection provided through the busbar members 169a, 169b and could if desired be dispensed with but that the 240-volt switch pattern is the only available series connection for the modules. The 12-volt current can of course be heavy and the switch pattern 196 would not alone be sufficient to carry it safely. On the other hand the 240-volt current will be relatively light and the switch pattern 197 will be perfectly adequate.

As a safety precaution, the wedge blocks 183 have extensions 202 thereon (FIGURE 11), and the tube 193 of the switch device 171 carries an eccentric 203 coact with a vertically moveable horizontal blocking bar 204 which prevents a 240-volt connection from being made to the battery unless the bar occupies the lower of two positions: the blocking bar 204 will, however, occupy the upper position under the influence of either or both wedge block extensions 202 and/or the eccentric 203 unless the busbar members 169a, 169b are disconnected from the 12-volt terminal members 184a, 184b and the switch device 171 is positioned to make the 240-volt connections.

Figure 5:
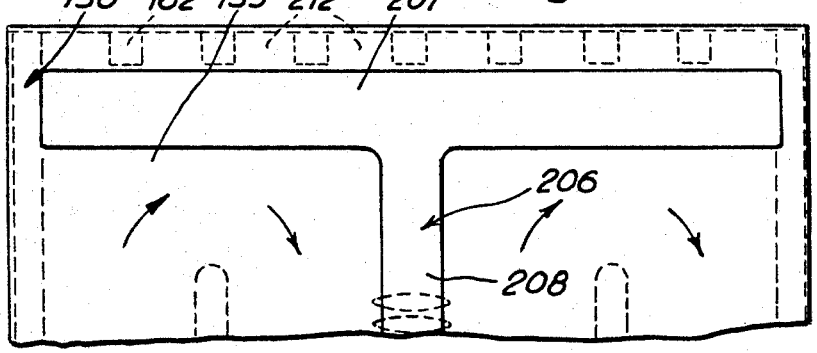
FIGURE 5 is a transverse vertical section taken on the line V—V shown in both FIGURES 6 and 7 of a further form of battery according to the invention.

In the space defined by each cooling plate 150, 151 and the adjacent insulating sheet 152 there is disposed an inflatable sealing member designated generally by the numeral 206 (FIGURE 5). This member, which can conveniently form an integral part of the insulating sheet 152 itself, comprises a horizontal limb 207 running the width of the cooling plate between the ridges thereof and trapped just below the projections 162, a central vertical limb 208 bifurcated near the bottom edge of the plate to accommodate the thickening 190 and merging into lateral extensions 209 which extend in the region just above the projection 164 between the thickening 190 and either rib 161. The hollow spaces within the inflatable member 206 communicate with each other and with the space within the neoprene member 170 which is not occupied by the switch device 171. This space in turn communicates with the interior of the tube 193 by means of a series of holes 210 located at intervals along the tube between the bushes 195 thereon. The tube 193 is connected at one of its ends (by means not shown) to a compressed air source (also not shown). It will be seen that with the member 206 deflated each cooling plate 150 or 151 and associated insulating sheet 152 defines throughpassages for cooling air comprising the apertures 211 between the projections 163, 164, the space between the sheets 159 and 152, and the apertures 212 between the projections 162. However, with the member 206 inflated by the application of compressed air to the tube 193, all these apertures are blocked. The main purpose of the projections 162, 163 and 164 is to stop expansion of the member 206 in undesired directions on inflation. Shallow ribs 213 are provided at the middle of the sheet 159 to register with the limb 208 of the member 206 and prevent left and right hand parts of the space between sheets 159 and 173 from being blocked off on expansion of that member.

Busbar members 169a and 169b provide respectively output and input headers for cooling water, and are accordingly connected at their ends to supply and discharge means (not shown). The spaces within the members 169a and 169b are in communication with the space within each cooling plate 150, 151. It will be seen that the thickenings 173 extend over only part of the width of each member 169a or 169b so that communication is permitted around these thickenings. It will be appreciated that the top of the members 169a, 169b is closed by the modules, cooling plates 150 and insulating sheets 152 except for the flow passages just described: a gasket may be provided to assist sealing.

For light currents at either 12 or 240 volts the water pressure to the input header provided by the busbar member 169b is shut off as is also the compressed air supply to the tube 193; hence the member 206 is deflated and natural draught air-cooling of each cooling plate 150, 151 takes place through apertures 211, 212. For heavy currents the compressed air and water pressure are turned on so that the member 206 is inflated to block off apertures 211, 212 and cooling water circulates as shown by the arrows in FIGURE 5.

To remove water from the cooling plates 150, 151 air may be blown through the busbar members 169a, 169b, and to assist deflation of the member 206 suction may be applied.

Naturally other cooling fluids besides water can be used, and the inflation of the member 206 could be carried out by, say, water under higher pressure than the water flowing around that member.

Instead of closing the apertures 211, 212 in the various cooling plates by the inflatable members 206, various alternative arrangements such as rubber strips or wedges, moveable flaps, belts, etc. can be resorted to, though the inflatable member 206 is preferred.

The battery just described permits heavy charge or discharge, and operation at either 12 or 240 volts. It has the great advantage that it can be charged from a 240-volt (or slightly higher voltage) A.C. mains through a relatively small rectifier without the need for a transformer.

Various features of the invention can be combined in different ways. Among various possible modifications, the FIGURE 4 construction can be modified by replacing the bands 47, 48, 50, 51 by a pair of bands consisting in the manner of the bands 47, 48, each band consisting of a pair of copper foils coated with lead on their outer sides and sandwiching metal wool or curled swarf produced in machining. Such bands are resilient over their thickness and in conjunction with endwise and lateral pressure effect good electrical and heat-conducting contact. The foils provide through passages which can be left open for air cooling or closed at top and bottom except for inlet and outlet openings to headers.

An essential feature of the battery according to the present invention is that the barrier layers are electrically conductive through their thickness over substantially the whole area. This suggests that the barrier layer should be of metal, but the nature of the electrolyte and the electrical potentials at the interfaces between the active layers and the barrier layer constitute a highly corrosive environment. Potentiostatic investigation as a means of selection of materials for the barrier layers is described in my Patent No. 3,141,795 above cited, but as above mentioned the present invention makes use of a barrier layer which incorporates impermeable carbon to provide at least a substantial part of the electrical conductivity, in particular the barrier layer may include a layer comprising discrete particles of impermeable carbon to present a multitude of conductive paths from one surface of the barrier layer to the other each of which is provided at least substantially through impermeable carbon.

Figure 12:
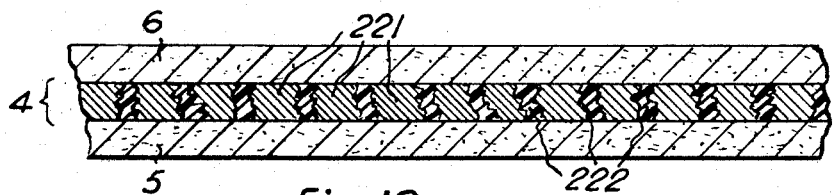
FIGURES 12 and 13 are cross sections showing two different forms of barrier layer which can be used in the battery of the invention.

As indicated in FIGURE 12 for example, discrete particles 221 of carbon extend each through the thickness of the barrier layer 4, in which they are bound together by a flexible binder 222 which is resistant to the electrolyte, the barrier layer 4 having a layer 5 of positive active material on one side and a layer 6 of negative active material on the other. The carbon particles not only resist the electrolyte but are also impermeable to it. Carbon of a substantially higher impermeability than is need can be produced as described for example in British patent specifications Nos. 860,342 and 889,351. Carbon materials of adequate impermeability and in fiber or fabric form which can subsequently be impregnated or bound with a binder are available commercially under the names HITCO carbon fiber and HITCO carbon cloth from the H. T. Thompson Fibreglass Co. Inc., and similar materials and graphite felts also which can be impregnated are available from National Carbon Company, Division of Union Carbide Corporation. Carbon filaments as formerly made on a large scale for electric lamps and still commercially manufactured constitute another form of flexible carbon of adequate impermeability for the present purpose. Again the growing of whiskers of carbon which are of adequate impermeability and which could be used for the present purpose is described, for example by L. Meyer in Zeitschrift für Kristollagraphie, vol. 109, pp. 61–67 (1957), and by Roger Bacon in Journal of Applied Physics, vol. 31, pp. 283–289 (1960).

Other forms of carbon of adequate quality for the present purpose are the carbon films by vacuum deposition from carbon arcs, the powder from broken arc electrodes, broken sugar impregnated nuclear graphite, pyrolitic graphite products and heat treated zinc chloride regenerated cellulose.

In general if carbon is heat treated to a sufficiently high temperature it can be graphatized and its impermeability improved. As above mentioned such extreme treatment is not necessary to obtain adequate impermeability for the present purpose and the term impermeable carbon used herein and in the claims is intended to denote carbon whether graphatized or not which has adequate impermeability and the other qualities already mentioned for its proposed use in the proposed battery.

In one method of producing the barrier layer the impermeable carbon is produced in the form of short fibers or powders, that is in a comminuted form. The desired fiber size (diameter and length) or the powder dimensions and shapes are attained as nearly as is practical by conventional methods by sieving or other selective measures, or for instance by breaking thin brittle carbon sheets by bending them over a small radius. The powders obtained in this way are substantially plate-like particles of equal thickness.

The first stages in the production of a thin coherent film for use as the barrier layer from these fibers or powders essentially follows the lines of paper manufacture. The fibers or powders are dispersed in a large quantity of water to which has been added a binder in the form of an emulsion and then deposited as a thin layer on a porous temporary support, the particles of the binder remaining lodged preferably at the irregularities of the fiber surface and the cross-overs of adjacent fibers as in usual paper production. A representative quantity example is:

100 kg. water+½ kg. carbon fibers
+½ kg. bitumen emulsion

The usual operations of paper making including drying, heating and pressing, are performed with the wet carbon fiber layer, until a dry porous carbon film of strength and coherence comparable to a sheet of paper emerges from the paper machine. A thin pile of thin carbon fiber paper is then presesd and impregnated with a flexible binding material adequately impermeable to the electrolyte with which it will come into contact during use, for instance bitumen, polyvinyl chloride, P.T.F.E. (Teflon or Fluon), wax rendered flexible by P.V.C., resins etc.

This layers of carbon or graphite powders may be impregnated with these binders so that the particles extend substantially through the whole thickness of the film sheet, each particle being bound to neighbouring particle only by the binder between them, and there being no continuous insulating binder film over, or parallel to, the surfaces of the sheet.

It is important that the barrier layer should be free of pinholes and to this end when made of carbon particles and a binder, pressure is used. For instance after volatile solvents have evaporated the plastic mixture may be extruded or calendered and sliced. The barrier layer should be prepared before the active material is applied or the barrier layer is applied to the active material.

Figure 13:
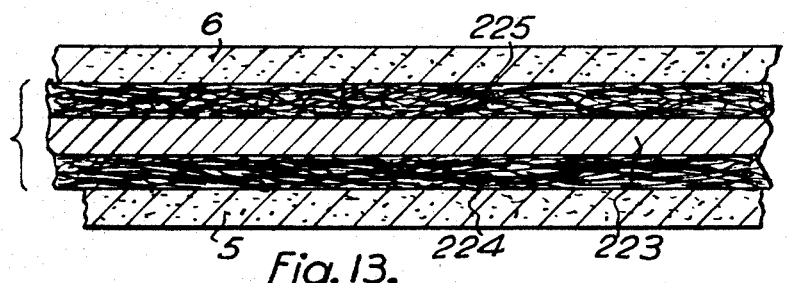

A single barrier layer conductive throughout, constituting only of carbon and insulating binder is already a practical solution of the problem of providing a barrier layer having a long life under the conditions of operation of a secondary battery wherein in any event the barrier layer presents a very long, tortuous and narrow corrosion path through its particulate or fibrous conductive carbon which is only very schematically indicated in FIGURE 13. In the case of the lead-acid battery there is the danger on the side carrying the positive layer that oxygen nascens liberated at the end of the charging part of the cycle will react with the carbon and the resulting gaseous reaction product, whether carbon monoxide or dioxide will act as an insulating bubble which will momentarily cover the surface of the attacked carbon particle or filament and thereby locally stop the functioning of the cell until it has floated away. The elasticity or tendency of the binder to swell helps to squeeze out the gas bubbles but the present invention provides better and additional protection against this damage.

Methods and means may be used as will be described later to minimize the evolution of oxygen, but insofar as oxygen is or may be liberated, one way of dealing with this problem provided by the invention is to incorporate lead, that is the metal from which the active material of the battery is formed, in the barrier layer. It may constitute the binder or impregnant for the carbon particles or fibres or it may be included with another e.g. resinous or bituminous impregnant, being for example dispersed in fine particle form therein. In particular the lead (which is electrically conductive) extends between the carbon particles and the active material at least at the interface with positive active material. These minute elements of the lead matrix stand adjacent the carbon and the positive layer and accordingly will react with the oxygen nascens and be converted into lead dioxide, the growth into lead dioxide hindering the free access of the oxygen at the interface of the barrier layer to the carbon particles.

This hindrance is enhanced by the fact that the progress of oxidation starting at the barrier surface is interrupted or finds a very tortuous path because of the discontinuous, or where continuous, random and winding structure of the lead binder which only fills those gaps left in the volume of the barrier layer which could not be filled with carbon particles and are necessary to render the sheet flexible. Thus the growth in depth of lead dioxide is limited by the inner carbon particles or very much slowed by the disposition and form, thin and long-winding, of the lead path between the carbon particles.

The "forming" process which will affect the lead particles on the barrier layer surface after a time is limited in the same way. It will therefore be understood that the lead dioxide particles, themselves not impermeable but not acting as insulators, are always backed by the conductive carbon and/or lead substance of the interior of the barrier layer and any transformation into sulphates is reversed during the normal charge cycle.

There are several methods of effecting the lead impregnation of the carbon layer. One is to deposit chemically, electrochemically or by vapourisation, a thin skin of metallic lead on the carbon particles and then to form them into a foil which can be compressed, if desired, under heat. Alternatively or subsequently they can be impregnated not only with colloidal graphite and/or lead, but also additionally with a plastic binder as above described. A preferred way, ensuring a higher degree of freedom from pores, is to extrude the lead covered carbon materials and calendar or slice them into foil thickness.

On the side of the barrier layer with which the negative active material is in contact not oxygen but hydrogen is liberated. Thus the need for protection against the action of oxygen nascens does not arise, and since neither carbon nor lead is attacked or corroded by hydrogen, the whole barrier layer can suitably be made of carbon particles bound with lead or incorporating lead as above described. Since however there is no need for protection against the action of oxygen on the negative side, the barrier layer on this side will be equally satisfactory if the carbon particles are held together by some other impermeable binder such as a flexible resin, P.V.C. etc. as above mentioned.

This leads to a three-layer structure of barrier layer as illustrated in FIGURE 13 which comprises a thin central layer 223 of lead, such as a simple lead foil, sandwiched between two carbon films, i.e. films of carbon particles held together by a binder. On the side which carries the layer of positive active material 5, the carbon film 224 includes a lead binder, while on the side which carries the layer of negative active material 6, the carbon film 225 has a binder of resin, P.V.C. or the like. In this case the lead foil 223 provides an electrically conductive path from the carbon fibers, fragments or the like of the one carbon film to those of the other and is itself adequately protected from access of the electrolyte which would in time corrode and penetrate it, by the carbon films.

The barrier layers above described with reference to FIGURES 12 and 13 provide specially for protection against corrosion by oxygen nascens. This danger only arises when this gas is liberated and it is well known that in the case of lead acid batteries gassing of high intensity only occurs when the batteries are nearly at the end of their charging cycle and the voltage is higher than 2.3 volts per cell. At 2.2 volts there is almost no gas development and at 2.3 volts only slight gassing occurs. It is therefore proposed that battery charging be stopped before the cell voltage has reached a value 2.3 volts at which strong gassing occurs although the battery may not be fully charged by that time. The ability of the present battery to withstand high rates of charge and discharge permits this restriction of capacity without serious economic disadvantage. It prolongs the life of the battery not only by the reduction of the danger from oxygen nascens, but also by leaving a small reserve of active material in front of the barrier layer which has not fully participated in the cycle of reaction.

In general similar conditions arise with other systems than lead-acid though the voltages will be different. The construction of barrier layer above described (with the appropriate metal in or as the binder on the positive side) can therefore be used, and also the reduction or elimination of gassing be employed by corresponding choice of the voltage at which charging is stopped.

Well known means of regulation can ensure the limitation of the charging cycle to the voltage rise permitted by the invention. These means are usually electrical voltage regulating and control devices. A cut-out by the charging current or warning signal can also be operated by a device directly sensitive to the gassing of the battery.

As a general rule the barrier layers provided by the invention comprise fragments (particles or fibers) of impermeable carbon held together or having the interstices between them filled with an impermeable binder. In the case of batteries of very small cross section it is possible to make the barrier layer as a continuous film of impermeable carbon of adequate strength and resilience to withstand the stresses of assembly.

A variant to small particles bound by a flexible binder which may be useful in some cases consists of plates of impermeable carbon of regular shape say square or hexagonal and larger than would be suggested by the term fragments which are bound together with a flexible binder which extends only between their adjacent edges leaving their principal surfaces unobstructed.

A further possibility envisaged by the invention serves to improve the conductive connection between the active material and the barrier layer, or between various layers of the barrier layer, particularly when the barrier layer is produced by laminating them together. This comprises the inclusion of a thin film of conductive substance resistant to the electrolyte under the conditions of operation of the barrier layer. The substance is suitably a lubricating medium of high viscosity and of electric resistivity below $10^3$ megohms per cubic centimeter. Such a liquid substance may also be used in some batteries as an impregnant of the carbon felt of the barrier layer. One example of such a substance is the range of synthetic lubricating liquids and greases commercially obtainable under the trade name Electrolube. For the purpose in view such a substance may also have colloidal graphite suspended in it.

Another point at which impermeable carbon can usefully be employed in the battery is directly on the outer face of the active layers. This may be in addition to or in place of the gauze or the like pervious insulating material 7 in FIGURE 1. In this case the carbon layer, though the carbon itself is impermeable must be pervious to the electrolyte and it may conveniently take the form of a loosely woven or knitted fabric of carbon fibers or a porous paper-like sheet. It will be conductive so that if it replaces the gauze there must still be a pervious insulating separator such as 15 of FIGURE 1 between the two pervious carbon layers within a cell. These carbon cover sheets may for instance be combined with a porous elastic separator material such as a "Porvic" sheet so that the elastic insulating porous separator is sandwiched between two thin porous carbon sheets which are kept securely separate from each other, but are pressed over their whole area against the opposite surfaces of the active material. The porous carbon layers do not impede the flow of the electrolyte through the openings or pores and the gaseous and other reaction products can pass through them as freely as the liquid, but they form respective conductive mats on the surface of the active material which counteract the effect of any disconnection of particles of active material by insulating films formed round such particles by the chemical reaction. They keep the particles in contact with themselves and thus at the positive or negative plate potential respectively and therefore as effectively active material. This applies especially in the present battery with its thin layers of active material and endwise pressure holding the active layers in good contact also with the surface of the barrier layer, the carbon sheets and the respective surfaces of the barrier layers being both at the negative or positive potential of the electrode, and there is therefore very little likelihood that this close contact from both sides can permit the conductive disconnection of any sizeable particle of active material by the formation of insulating lead sulphate skins completely covering these particles. They will therefore remain connected and active in the oxidation reduction cycle of the cell and part of the capacity of the battery during charge and discharge almost indefinitely.

The graphitised carbons referred to earlier are expensive to produce and the present invention provides a method which is cheap to practice but results in a sheet of carbon or graphite which has adequate impermeability for the purposes here in view. This method produces thin carbon films by directly carbonising and subsequently graphitising a thin tissue paper. The paper used may be thin and porous (like blotting paper) and made of the finest hemicellulosic fibers derived for instance from wheat straw, esparto or eucalyptus grass. Alternatively a slightly thicker paper made from the cellulose fibers with a velvet structure, that is with fibers erected at a substantial angle to and stretching out of the paper surface may be used. Pelton airdried vellum and drawing cartridge are examples of such a type.

It is important to specify or select paper which has been made on a modern paper machine which can defibrilize the hemicellulosic or cellulosic materials to such extremely fine single fibers that the fibre surface within the thin paper is very great.

Figure 14:
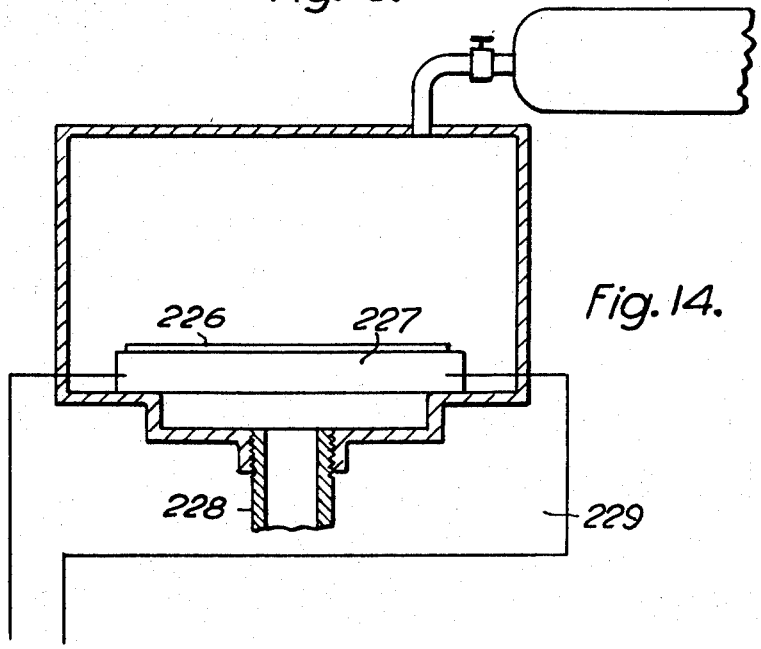
FIGURES 14 and 15 are diagrammatic cross sections illustrating two stages in the production of a material which can be used in the construction of the battery.
Figure 15:
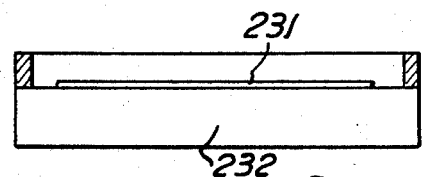

The process of the invention illustrated by FIGURES 14 and 15 consists basically in placing this paper 226 on a porous graphite support 227 and heating it slowly in an inert atmosphere first under pressure until it is fully carbonized and then graphitising it while on the same support until the carbon crystallites become impermeable. The latter requirement means taking it above 2100° C.

The cost reduction, simplification and improvement which this process of the present invention brings is based on (a) the fact that present paper technique using modern jordans can defibrilise and hydrate cellulose and hemicellulose and produce a paper in which the single fibers are so fine that their surface is as great or greater than the surface of the fibers in the regenerated pulp of the process of British patent specifications Nos. 860,342 and 889,351. (b) The fact that the carbonisation process in which the problem is to have as little obstruction as possible to the gases and vapours escaping gently from the heated cellulose or hemicellulose is very much easier to solve when a sheet of paper is heated rather than a thick mass of compressed pulp.

In the present case the cellulose fibers are not only extremely thin and therefore have a large surface area, but the actual paper surface is so close to any point within the thickness and so full of pores that the escape of gases to this surface is substantially unobstructed. A great proportion of the fibers are actually on the surface or stick out of it in the papers having a "pile." The heating prior to the actual graphitization can therefore proceed more quickly and, although it is still desirable for it to proceed under pressure and in an atmosphere which is inert to the paper (cellulose or hemicellulose), the pressure control is simpler and the efficiency is higher.

The carbonized paper is very brittle and sensitive and even more so after the graphitization which follows the carbonizing. The paper therefore remains on the porous graphite support all the time during carbonizing and graphitizing. The extraction of the gases and vapours is effected through the porous support 227 as indicated by the draw off pipe 228 and the pressure gradient in the furnace is downwards, thus keeping the paper firmly in place on the support. Furthermore, this graphite support can provide at least part of the heat by being used as an electric heating element while it is in the "furnace" as indicated by the leads 229. For this purpose a heavy current is passed through it and regulation of the current permits convenient and rapid heat regulation during the process. The brittle carbon film 231 is finally transferred to an impregnating table 232 while it is preferably at the same temperature as the impregnating liquid, for instance the bitumen. The table surface is also preferably kept hot.

The expression "foil" has been used at various points in this specification and claims. There is no universally accepted definition of foil enabling it to be distinguished from sheet. In commerce the various trades draw the line according to a given thickness which varies with different materials: for a given material the distinguishing line varies with different trades and in different countries. Broadly, it may be said that in all cases sheet less than 0.006 inch thick is universally called a foil but that a sheet more than 0.030 inch thick is rarely so called, the classification being arbitrary between these limits. Herein the term foil is intended to cover individual layers up to at least about 0.030 inch provided that the sheet material whether consisting of one layer or several such layers can be reeled and treated in the manner of a flexible band.

What I claim is:

1. A secondary electric battery having a plurality of individual cells to be activated by an electrolyte and connected electrically in series, including a plurality of closely spaced generally parallel aligned thin flexible intermediate bipolar plates, each intermediate bipolar plate comprising a barrier layer and two outer layers, the barrier layer being as a whole electrically conductive through its thickness over substantially all of its area and impervious to the electrolyte and the two outer layers being of active material on opposite sides of the barrier layer and in good contact therewith over substantially its whole area, the plates being arranged so that active layers of opposite polarity alternate throughout the series, a barrier layer with a single layer of active material of appropriate polarity closing each of the two end cells of the series, flexible electrolyte resistant electrical insulating material completing electrolyte chambers between the active layers of successive bipolar plates and of the end cells, pervious electrically insulating means located between the active layers in every cell, pervious supporting means disposed over substantially the whole area of each active layer, and means exerting endwise pressure on the battery thereby causing said supporting means to hold the active layers each in pressure contact with its respective barrier layer over substantially the whole area of the barrier layer.

2. A secondary electric battery as set forth in claim 1 in which the barrier layers incorporate particles of impermeable carbon constituting the major part of the layer and a binder consisting at least partly of the metal from which the active layer adjacent to the barrier layer is formed.

3. A secondary electric battery as set forth in claim 1 in which the barrier layers incorporate particles of impermeable carbon constituting the major part of the layer and a binder comprising lead holding said particles together.

4. A lead-acid secondary electric battery as set forth in claim 1 wherein each barrier layer includes a central layer of lead, a second layer on the side of the lead which carries the negative active material consisting essentially of particles of impermeable carbon held together by a binder of resinous materials resistant to the electrolyte, the particles constituting paths from the active material to the lead distributed over substantially the whole area of the layer, and a third layer on the side of the lead which carries the positive active material consisting of particles of substantially impermeable carbon held together by said binder, said third layer incorporating minute metallic lead elements extending between the carbon particles and the active material at least at the interface with the positive active material.

5. A composite secondary electric battery including a plurality of units each as set forth in claim 1 assembled in end to end relationship, cooling means interposed between adjacent units extending substantially over the whole area of the ends of the units and incorporating passages for the flow of a cooling fluid, inlet and outlet headers communicating with said passages, said passages being closed except to said headers, and retainer means embracing the units, said retainer means holding the units and cooling means in assembled relationship and also constituting the means whereby endwise pressure is exerted on the units.

6. A composite secondary battery as set forth in claim 5 wherein said cooling means also serves to make external electrical connection with the battery units.

7. A composite secondary electric battery including a plurality of units each as set forth in claim 1 assembled in end to end relationship, hollow cooling members interposed between said cooling members each defining an interior chamber and providing at least four openings leading into said chamber, a first pair of openings for passage through said chambers of cooling liquid and a second pair of openings for passage through said chamber of cooling air, inlet and outlet headers for cooling liquid in communication with the first pair of openings, inflatable elastic means within each cooling member which when inflated block the second pair of openings therein whereby to provide a passage closed to the exterior for cooling liquid flowing through the member between the headers, and when deflated unblock said second pair of openings whereby to admit air to said openings, conduit means to convey pressure fluid to said elastic means and retainer means embracing the units, said retainer means holding the units and cooling means in assembled relationship and also constituting the means whereby endwise pressure is exerted on the units.

8. A composite secondary electric battery including a plurality of units each as set forth in claim 1 assembled in end to end relationship, combined cooling and electric contact making means interposed between adjacent units, said combined means comprising between each two units a pair of conducting and mutually insulated plates providing cooling passages, said conducting plates making surface contact over substantially the whole area of the end barrier layers of the units between which the conducting plates are interposed, similar combined means at the ends of the assembly end comprising one conducting plate making surface contact with one end barrier plate of the assembly, retainer means holding the assembly of units and combined means together and constituting the means whereby endwise pressure is exerted on the units, a shaft extending longitudinally of the whole assembly, and switching means carried by said shaft and movable between two positions in one of which the switching means coacts with said conducting plates to connect the units in parallel and in the other of which the switching means coacts with said conducting plates to connect the units in series.

9. A composite secondary electric battery including a plurality of units each as set forth in claim 1 assembled in end to end relationship, a pair of mutually insulated conducting plates between each two adjacent units and having the conducting plates respectively in contact with substantially the whole area of the end barrier plate of the adjacent unit, said pair of plates also defining cooling passages, respective end conducting plates in contact with substantially the whole area of the end barrier plates of the assembly, means coacting with said end conducting plates to define further cooling passages, contact surfaces on all said conducting plates, and connecting means providing alternative communication through said contact surface to such units, one connection joining the units in series and the other connection joining the units in parallel, said connection means including a pair of bus bars extending longitudinally of the assembly to provide the parallel connection, said bus bars being hollow and also constituting headers for cooling fluid and having connections with said cooling passages.

10. A secondary electric battery including a barrier layer having a layer of active material on at least one surface, said barrier layer including a layer comprising discrete particles of substantially impermeable carbon disposed to present a multitude of conductive paths from one surface of the barrier layer to the other each of which is provided at least substantially through substantially impermeable carbon.

11. A secondary electric battery as set forth in claim 10 wherein each barrier layer includes a layer comprising discrete particles of substantially impermeable carbon disposed to present a multitude of conductive paths from each layer of active material on the barrier layer distributed over substantially the whole area of contact between the active material and the barrier layer.

12. A secondary electric battery as set forth in claim 11 wherein the carbon particles are fibers felted together.

13. A secondary electric battery as set forth in claim 11 wherein the carbon particles comprise fibers intermeshed together.

14. A secondary electric battery as set forth in claim 11 wherein the particles are held together by a flexible binder filling the interstices between the particles, the particles constituting the major part of the total volume of the layer.

15. A secondary electric battery as set forth in claim 14 wherein the binder at least contains the metal from which active material of the battery is formed.

16. A secondary electric battery as set forth in claim 1 wherein the barrier layer structure contains electrolyte resistant lubricating medium of high viscosity and of electric resistivity below $10^3$ megohms per cubic centimeter.

17. A lead-acid secondary electric battery as set forth in claim 1 in which each barrier layer of a bipolar plate comprises a central layer of lead, a second layer on one side of said layer of lead consisting of discrete particles of impermeable carbon held together by a binder resistant to the acid, a layer of negative active material on said second layer, the carbon particles presenting a multitude of electrically conductive paths from the negative active material to the lead layer distributed over substantially the whole area of the plate, a third layer on the other side of said layer of lead consisting of discrete particles of impermeable carbon held together by a binder of lead and a layer of positive active material on said third layer, said third layer presenting an electrically conductive path between the positive active material and said lead layer over substantially the whole area of the plate.

18. In a battery as set forth in claim 17, means for stopping the charging side of the cycle when the voltage per cell is less than 2.3.

19. A secondary electric battery as set forth in claim 1 wherein said pervious supporting means comprises a flexible pervious layer consisting of fragmentary impermeable carbon with interstices between.

20. A secondary electric battery as set forth in claim 19 wherein the fragments of carbon are felted together.

21. A secondary electric battery as set forth in claim 19 wherein the fragments of carbon are in the form of fibres which are intermeshed.

References Cited

UNITED STATES PATENTS

| | | | |
|---|---|---|---|
| 3,087,003 | 4/1963 | Drengler et al. | 136—10 |
| 3,141,795 | 7/1964 | Eisler | 136—6 |
| 1,884,600 | 10/1932 | Derby | 23—209.3 |
| 2,776,331 | 1/1957 | Chapman | 136—75 |
| 3,082,281 | 3/1963 | Pevere et al. | 136—75 |
| 3,116,975 | 1/1964 | Cross et al. | 23—209.4 |
| 3,119,722 | 1/1964 | Tietze et al. | 136—6 |

WINSTON A. DOUGLAS, *Primary Examiner.*

JOHN H. MACK, *Examiner.*

B. J. OHLENDORF, A. SKAPARS.

*Assistant Examiners.*